(12) United States Patent
Yoshinaga (10) Patent No.: US 8,670,861 B2
(45) Date of Patent: Mar. 11, 2014

(54) ARTICLE STORAGE FACILITY

(75) Inventor: Kazuharu Yoshinaga, Shiga (JP)

(73) Assignee: Daifu Co., Ltd. (JP)

( * ) Notice: Subject to any disclaimer, the term of this patent is extended or adjusted under 35 U.S.C. 154(b) by 0 days.

(21) Appl. No.: 13/383,997

(22) PCT Filed: Jun. 30, 2010

(86) PCT No.: PCT/JP2010/061136
§ 371 (c)(1),
(2), (4) Date: Mar. 6, 2012

(87) PCT Pub. No.: WO2011/007667
PCT Pub. Date: Jan. 20, 2011

(65) Prior Publication Data
US 2012/0189411 A1    Jul. 26, 2012

(30) Foreign Application Priority Data

Jul. 14, 2009 (JP) .................................. 2009-165906

(51) Int. Cl.
*G06F 7/00* (2006.01)
(52) U.S. Cl.
USPC .............................. 700/218; 700/214; 700/216
(58) Field of Classification Search
USPC .............. 181/178.5, 178.1; 187/400, 401, 216
See application file for complete search history.

(56) References Cited

U.S. PATENT DOCUMENTS

| 6,220,391 B1 * | 4/2001 | White ......................... 182/178.5 |
| 2008/0044262 A1 * | 2/2008 | Kim et al. ..................... 414/273 |

FOREIGN PATENT DOCUMENTS

| CN | 101096243 A | 1/2008 |
| CN | 101187261 A | 5/2008 |
| DE | 10038666 C1 | 1/2002 |
| JP | 62164206 | 10/1987 |
| JP | 5265991 | 10/1993 |
| JP | 0618547 | 3/1994 |
| JP | 06211315 | 8/1994 |
| JP | 2006001725 | 1/2006 |

OTHER PUBLICATIONS

International Search Report for PCT/JP2010/061136, English translation attached to original, Both completed by the Japanese Patent Office on Sep. 24, 2010, All together 3 Pages.
Search Report dated Oct. 11, 2013 for corresponding EP Application 10799727.2.
Office Action dated Aug. 5, 2013 for corresponding CN Application 201080040475.3.

* cited by examiner

Primary Examiner — Ramya Burgess
Assistant Examiner — Lester Rushin
(74) Attorney, Agent, or Firm — Brools Kushman P.C.

(57) ABSTRACT

An article storage facility with a storing shelf structured by lining up a plurality of article storage units in the vertical direction and the horizontal direction. A stacker crane travels along a traveling rail to transport articles to each article storage unit. The stacker crane has a traveling cart having a pair of vertical-movement guiding masts set upright on both ends of the traveling cart in the front-back width direction, and a vertical-movement platform movable vertically along the pair of vertical-movement guiding masts between the pair of vertical-movement guiding masts. An article transfer device is provided on the vertical-movement platform. The stacker crane has a work frame, having a width in the sideways direction of the traveling cart and the front-back width direction of the traveling cart between the pair of vertical-movement guiding masts structured so as to be freely attached and removed.

15 Claims, 7 Drawing Sheets

ARTICLE STORAGE FACILITY

TECHNICAL FIELD

The present invention relates to an article storage facility comprising storing shelves composed of a plurality of article storage units lengthwise and breadthwise, a stacker crane arranged to be runnable along travelling rails provided at the front side of the storing shelves along the sideways widthwise direction of the storing shelves to transfer articles to each of the article storage units, and a crane control means for controlling the actuation of the stacker crane; where said stacker crane comprises a travelling cart runnable along the travelling rails, a pair of front and rear vertical-movement guiding masts being stood from the travelling cart with a space in the front-back width direction of the travelling cart, a platform being guided and supported by the pair of front and rear vertical-movement guiding masts between the pair of front and rear vertical-movement guiding masts, and an article transfer device being provided on the platform.

BACKGROUND OF THE INVENTION

In the type of article storing facility mentioned above, running operation of the travelling cart and lifting operation of the platform are performed by the crane control means, which controls the stacker crane in order to position the article transfer device to a target transfer position with respect to the article storage units and to transfer articles between the article transfer device and the article storage units.

Such article storing facilities have a problem that articles stored in the article storage units could be moved out from proper storing positions due to incidents, such as an earthquake. For instance, if articles move out from the proper stored position to the front side in the front-back width direction of the storing shelf and are thus projected from the front side of the article storage, the article would contact to the stacker crane which is running along the travelling rails. While, if articles move out from the proper storing position in the sideways widthwise direction of the storing shelf, the article transfer device, which is positioned at the target transfer position could not transfer the articles between the device and the article storage unit. Therefore, for such article storage units, in which articles have moved out from the proper storing position, an operator has to correct of the position of the articles to the proper storing position, and thus it is required that the operator is able to move to each of the article storage units in order to perform the correction.

Further, even in case of a system shut down of the facility or a power supply failure, unloading articles stored in the article storage units is sometimes required. In such a case, an operator has to unload the articles stored in the article storage units by themselves, so that it is necessary that the operator be able to approach each of the article storage units.

Therefore, conventional article storage facilities are provided with a ladder along the vertical-movement guiding masts of the stacker crane, which operators walk up to approach to the target article storage unit. (See, for instance, Patent Publication 1)

In other article storage facilities, a cab is arranged outside of the masts for guiding the lifting of the stacker crane on which operators can board, so that it can be freely lifted along the masts by a lift driving means for the cab. In this case, operators are lifted with the cab to be moved to the point of the target article storage. (See, for instance, Patent Publication 2).

PRIOR ART STATEMENT

Patent Publications

Patent Publication 1: Japanese Patent Preliminarily Publication No. 2006-1725
Patent Publication 2: Japanese Patent Publication No. 3094713

SUMMARY OF THE INVENTION

Task to be Solved by the Invention

According to the facility disclosed in Patent Publication 1, an operator has to perform each type of work with respect to the article storage unit, such as the correction of the position of articles or pick-up of the articles, whilst situated on a ladder, which makes each type of works with respect to the article storage unit difficult. Such a drawback becomes particularly marked when working with respect to articles located in a high place, in that, as such work has to be performed at a location which is high, the correction of the position of the articles or the pick-up of articles becomes very difficult.

According to the facility disclosed in the Patent Publication 2, since an operator can perform various types of work, such as the correction of the position of articles or the pick-up of the articles, with respect to the article storage unit in a condition of riding on the cab, the work can be performed more easily, so that the working activity of the operator with respect to the article storage can be improved. However, the work frame has to be preset onto the vertical-movement guiding masts of the stacker crane, which makes the structure of the facility complex. In addition, since the work frame should be set at a position so as not to interrupt the lifting of the platform, the cab is provided in a condition in which it is protruding to the outside of the masts. Therefore, the size of the stacker crane becomes large in the front-back width direction of the travelling cart, which incurs an increase in the size of the facility.

The present invention has been designed, paying an attention to these matters. The purpose of the invention is to provide an article storage facility by which the various types of work with respect to the article storage unit can be performed easily and therefore the workability of an operator with respect to the article storage unit is improved, without making the structure of the facility complex and large.

Means for Solving the Task

In order to achieve the purpose, the article storage facility according to the invention has a first characteristic structure such that: the article storage facility comprises a storing shelf having a plurality of article storage units arranged lengthwise and breadthwise, a stacker crane, which is arranged to be runnable along travelling rails provided at the front side of the storing shelves along the sideways widthwise direction of the storing shelves to transfer articles to each of the article storage units, and a crane control means for controlling the actuation of the stacker crane; said stacker crane comprises a travelling cart runnable along the travelling rails, a pair of front and rear vertical-movement guiding masts being stood from the both end portions of the travelling cart in the front-back width direction thereof, a platform freely movable in a vertical direction along the pair of front and rear vertical-movement guiding masts and provided between the pair of front and rear vertical-movement guiding masts, and an article transfer device being provided to the platform; wherein said stacker crane is constructed so as to have a work frame between said pair of front and rear vertical-movement guiding masts being attachable thereto or detachable therefrom with a set width in the front-back width direction and the sideways widthwise direction of the travelling cart.

According to the first characteristic structure, the work frame is provided between the pair of front and rear vertical-movement guiding masts in a attachable or detachable manner, thereby the work frame can be attached thereto at a height corresponding to that of the article storage unit of the target articles to which the correction or pick-up work should be performed, because the pair of front and rear vertical-movement guiding masts of the stacker crane are arranged to lift and guide the platform to enable transfer of articles with respect to all of the plurality of article storage units being provided lengthwise and breadthwise. Therefore, an operator can perform the correction of the position of articles or pick-up of the articles, whilst riding on the work frame which thus makes the work easier. In addition, the work frame can be installed only when the correction or the pick-up work is necessary and can be uninstalled when it is not required. Therefore, the work frame would never interrupt the vertical movement of the platform. Thus, by the installation of the cab effectively utilizing the region for the vertical movement of the platform, the structure of the facility can be made simpler and the size of the travelling cart of the stacker crane in the front and rear direction thereof can be made smaller, compared to the facility disclosed in the Patent Publication 2, where the work frame is preset on the vertical-movement guiding masts.

According to the characteristic structure mentioned above, an article storage facility can be realized in which various types of work with respect to the article storage unit can be performed more easily and the workability of an operator with respect to the article storage unit is improved without incurring an increase in complexity and size of the structure.

The second characteristic structure of the article storage facility according to the present invention is: the work frame has a width extending across the full length of the distance between the pair of vertical-movement guiding masts in the front-back width direction of the travelling cart, and is comprised of edge members located on edges in the front-back width direction of the travelling cart and an intermediate member connecting the edge members, the edge members are fixed to the vertical-movement guiding masts, respectively, so as not to interfere with the platform, and the intermediate member is arranged to be attachable to and detachable from the edge members.

According to the second characteristic structure, by preliminarily setting only the edge members, which constitute a part of the work frame, the work frame can be installed or uninstalled only by an operation in which the intermediate member is installed to or uninstalled from the edge members. In addition, since the edge members are fixed to the vertical-movement guiding masts, respectively, the work frame can be installed at a level required by adjusting the height setting of the edge members as required. Furthermore, since the setting position of the edge members is arranged to prevent any interference to the platform, even if the edge members are preliminarily fixed to the vertical-movement guiding masts, they would not interrupt the vertical movement of the platform.

The third characteristic structure of the article storage facility according to the invention is: the edge members have a rod-like shape being extended from the vertical-movement guiding masts to both sides in the sideways widthwise direction of the travelling cart; and the intermediate member comprises of a pair of rod-like shaped first intermediate sub-members, which are freely installed to or uninstalled from the edge portions of the edge members in the width direction of the travelling cart and which are extended in the front-back width direction of the travelling cart when it is installed to the edge members, a plate-like second intermediate sub-member, which is freely installed to or uninstalled from the pair of first intermediate sub-members in a condition in which it is extended across the pair of first intermediate sub-members, and a bars-like shaped third intermediate sub-member, which is freely installed to or uninstalled from the pair of first intermediate sub-members in a condition in which it is extended in an upper direction.

According to the third characteristic structure, the edge members have a rod-like shape, which are extended from the vertical-movement guiding masts to both sides of the travelling cart in its sideways widthwise direction. The pair of first intermediate sub-members can be installed to the edge portions of the rod-like edge members, so that a frame-like member can be formed which has a first width extended across the full length of the distance between the pair of vertical-movement guiding masts in the front-back width direction of the travelling cart and a second width extended across the full length of the edge member in the sideways widthwise direction of the travelling cart. To the frame-like member, the second intermediate sub-member can be installed so as to be extended across the full length of the first intermediate sub-members, so that a work frame can be formed which has a first width being extended across the full length of the distance between the pair of vertical-movement guiding masts in the front-back width direction of the travelling cart and a second width being extended across the full length of the edge member in the sideways widthwise direction of the travelling cart. Therefore, a sufficient space can be maintained for an operator to perform necessary work, such as the correction of the position of the articles or pick-up of the articles from the article storage unit and the workability can be improved. In addition, it is possible to arrange the bar-like shaped third intermediate sub-member so as to be extended from the first intermediate sub-members in an upper direction, so that it is possible to provide an advantageous work frame for the operator which enables the operator on the work frame to perform work in a safe and easy manner. Furthermore, since the intermediate member is composed of three intermediate sub-members, the operator can easily carry each sub-member, resulting in simplifying the installing and uninstalling of the work frame.

The fourth characteristic structure of the article storage facility according to the invention is: the edge members are arranged to be freely installable to the masts in a condition in which they support the first intermediate sub-members from the lower side and the first intermediate sub-members are arranged to be freely installable to the edge members in a condition in which they support the second intermediate sub-members from the lower side.

According to the fourth characteristic structure, the second intermediate sub-member is supported by the first intermediate sub-members and the first intermediate sub-members are supported by the edge members. Therefore, the load acting on the second intermediate sub-member and on the first intermediate sub-members can be carried by the edge members. While, since the edge members are pre-set onto the vertical-movement guiding masts, the edge members can be firmly fixed to the vertical-movement guiding masts at the time of installation. In this manner, the load, which acts on the work frame, can be appropriately supported by such a firm fixation of the edge members with respect to the vertical-movement guiding masts, which renders the work of firmly fixing the detachable members, such as first and second intermediate sub-members, unnecessary. And therefore, the installation of these intermediate members is made simple, while keeping the strength of the work frame comparatively strong.

The fifth characteristic structure according to the present invention is: the facility has an install condition detecting means for detecting an install condition of the work frame between the pair of vertical-movement guiding masts, and the crane controlling means inhibits the vertical movement of the platform when the install condition detecting means detects the condition in which the work frame has been installed.

According to the fifth characteristic structure, the crane controlling means is arranged such that when the install condition detecting means is detecting the condition in which the work frame is installed it inhibits the activity of the platform. Therefore, an accident when the work frame is installed, the platform moving up or down by mistake and then the platform and the work frame contacting to each other can be adequately prevented.

The sixth characteristic structure according to the invention is: the work frame can be freely installed to a plurality of install positions, which are spaced apart from each other in a vertical direction; and the lowest install position among those is set at a position, which is at a higher side than the region that the platform itself and articles exciting on the platform occupy when the platform is moved to the lowest position of the movement range of the platform.

According to the sixth characteristic structure, a plurality of install positions are provided and a work frames can be installed to each of the install positions. Therefore, it is possible to install a plurality of work frames in order to perform the work with respect to the article storage units at different heights in an effective manner. Further, since the lowest install position among the plurality of install positions is located at a higher side than the region that the platform itself and articles existing on the platform occupy when the platform is moved to the lowest position of the movement range of the platform, it is possible to place the platform at the lowest position of the movement range of the platform only by sending an instruction for letting the platform down to the lowest position of the movement range to the crane controlling means, and then the work frame can be installed to the lowest install position. In this way, the handling for the vertical movement of the platform to install the work frame is made easy, while the works with respect to the article storage unit can be performed in an effective manner.

BRIEF EXPLANATION OF THE DRAWINGS

FIG. 8 is a perspective view representing an installed work frame.

EMBODIMENTS FOR CARRYING OUT THE INVENTION

An embodiment of the article storage facility according to the present invention will be explained, referring to the drawings.

Figure 1:
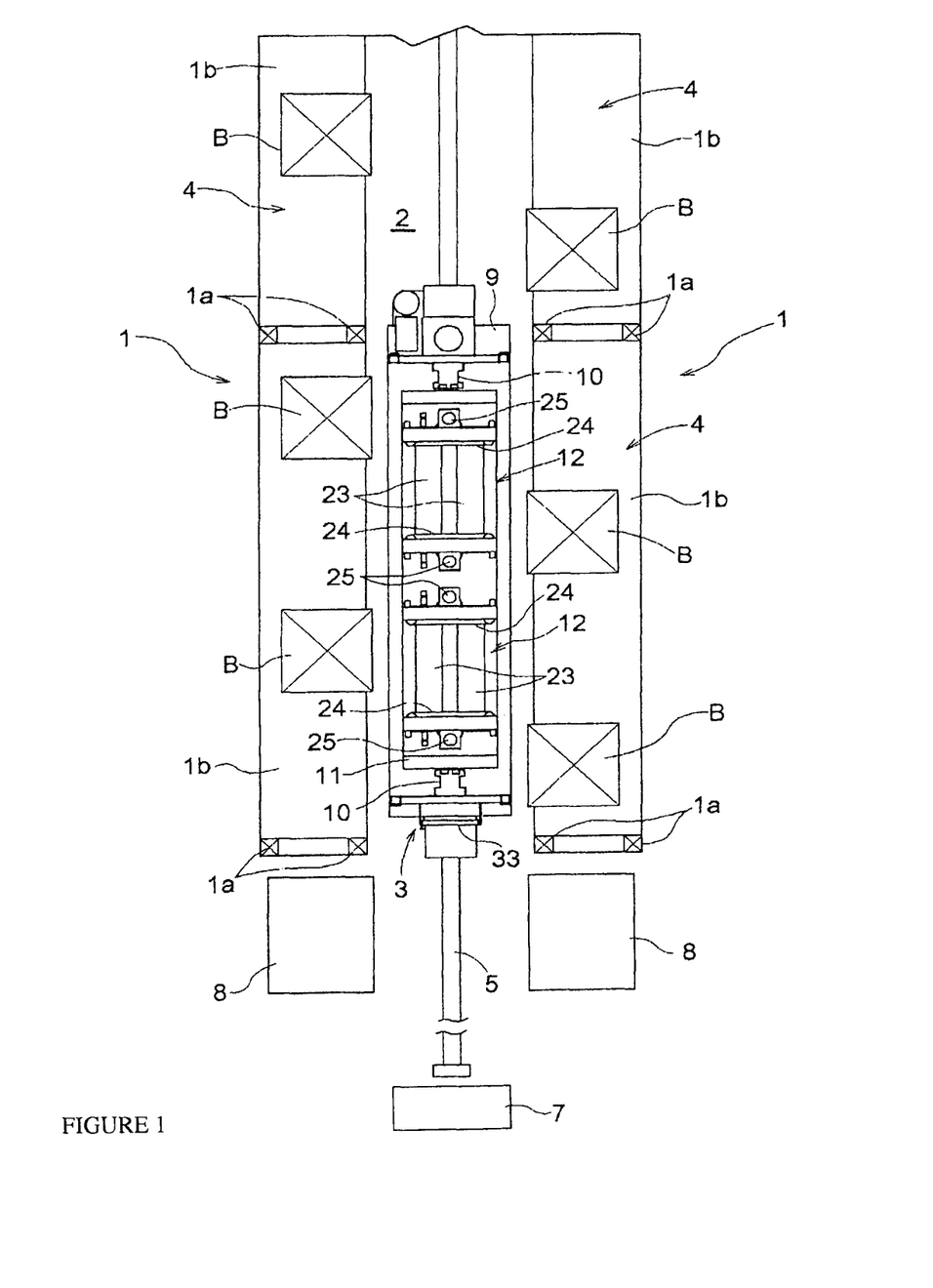
FIG. 1 is a plan view showing a part of the article storage facility.
Figure 2:
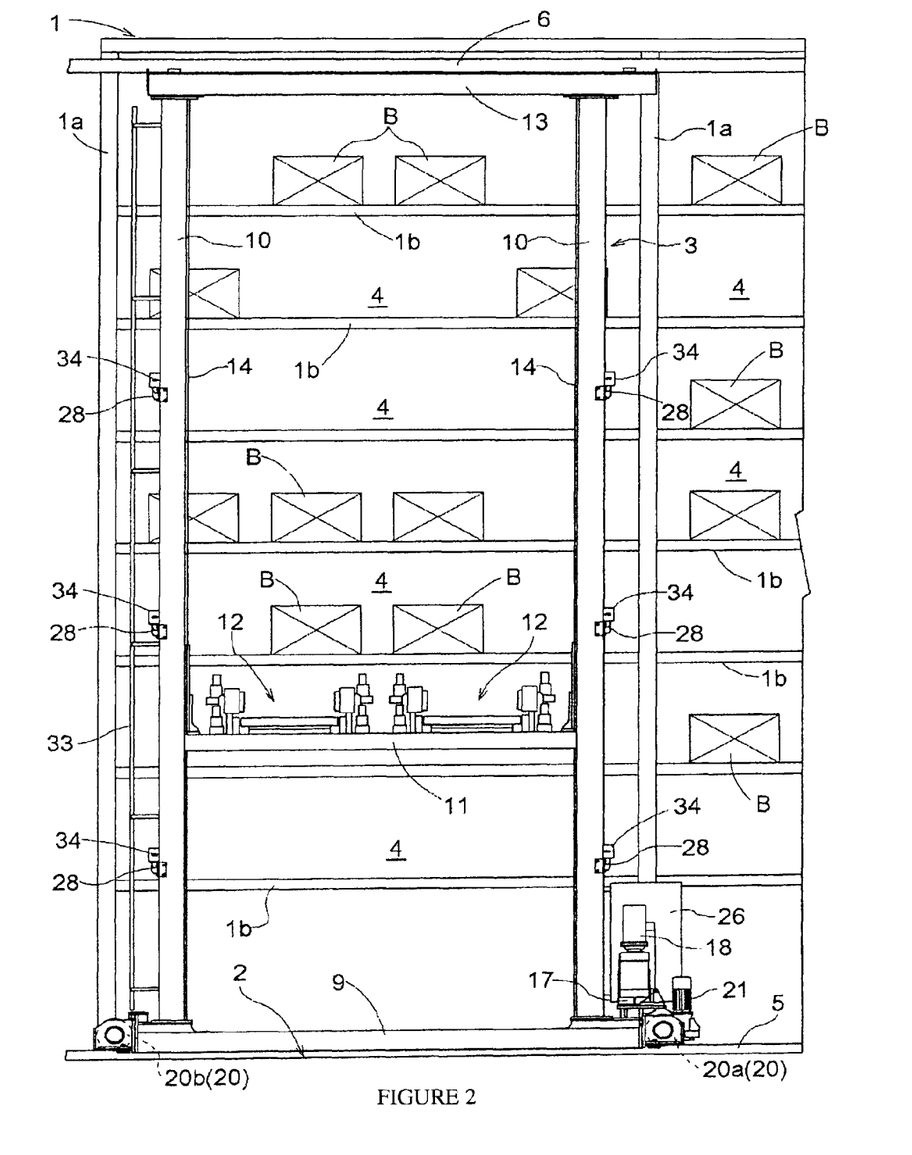
FIG. 2 is a side view depicting a part of the article storage facility.

As shown in FIGS. 1 and 2, the article storage facility is comprised of two storing shelves 1 being arranged to be spaced from each other so that the fronts thereof, through which articles B are transferred in and out, face towards each other, and a stacker crane 3 which automatically travels along a travelling path 2 provided between the storing shelves 1.

Each of the storing shelves 1 comprises a plurality of rods 1a, which are stood in a sideways widthwise direction of the storing shelf (a vertical direction in FIG. 1 and a horizontal direction in FIG. 2) being spaced from each other, and an article mount plate 1b, which is arranged to be extended across the plurality of rods 1a provided in the sideways widthwise direction of the shelf. The storing shelves 1 are arranged so as to store articles B in a manner that the articles B are mounted and supported by the article mount plate 1b and the article storage units 4 for storing the articles B are arranged lengthwise and breadthwise. The storing of the articles B into the storing shelf 1 is performed in such a manner that the plurality of articles B are arranged on the article mount plate 1b, which is provided between rods 1a being adjacent to each other in the sideways widthwise direction of the shelf. It should be noted that in the drawings a plurality of articles B having the same or almost the same width in the sideways widthwise direction of the shelf are arranged on the same article mount plate 1b, however, it is possible to arrange a plurality of articles B with different widths in the sideways widthwise direction of the shelf on the same plate.

On the floor side of the travelling path 2, a travelling rail 5 is provided along the sideways widthwise direction of the storing shelf 1; and on the ceiling side thereof, a travelling rail 6 is provided along the sideways widthwise direction of the shelf.

At an end of the travelling rail 5, a ground controller 7 for managing the activity of the stacker crane 3 is provided. At the points adjacent to the end portions of the storing shelf 1 in its width direction, a pair of loading or unloading portions 8 is provided across the travelling rail 5 is provided. The loading or unloading portions 8 are for mounting and supporting the articles B to be loaded into the storing shelf 1 or to be unloaded from the storing shelf 1 in order to deliver the articles B to the stacker crane 3. The loading or unloading portions 8 can be constituted by, for example, a conveyer or a load mounting table.

The stacker crane 3 comprises a travelling cart 9 which is runnable along the travelling rail 5, a pair of vertical-movement guiding masts 10 which are stood from the travelling cart 9, a platform 11 which is liftable along the pair of vertical-movement guiding masts 10 between the masts 10, and an article transfer device 12 is provided on the platform 11.

The vertical-movement guiding masts 10 are provided at a front edge and rear edge of the travelling cart 9 in its front-back width direction, respectively, as a pair. At the upper ends of these vertical-movement guiding masts 10, an upper frame 13 is provided which connects the upper ends of the pair of vertical-movement guiding masts 10 to each other and which is guided by the guide travelling rail 6.

The platform 12 is freely guided and supported by the pair of vertical-movement guiding masts 10 stood from the travelling cart 9 in a vertical direction and is suspended and supported by a lifting wire 14 (a part thereof is not shown in the drawings), which is connected to both ends of the platform 12. The lifting wire 14 is wound onto guide pullies (not shown) which are provided on the upper frame 13, etc., and connected to a wind-up drum 17, which is provided at an end of the travelling cart 9. The wind-up drum 17 is inversely driven and rotated by means of an electric inverter-type motor 18 for lifting the platform 11 by winding or unwinding the lifting wire.

Not shown in the drawings, but the platform 11 is provided with a lifting rotary encoder for detecting the lifted position of the platform 11 in the vertical direction. Around the rotation axis of the lifting rotary encoder, a sprocket is provided so as to be threaded with a chain, which is provided along the vertical-movement guiding masts 10 in the longitudinal direction thereof. The lifting rotary encoder detects the lifted position of the platform 11 in the vertical direction on the basis of the lifted distance of the platform 11.

On the travelling cart 9, front and rear wheels 20 which are runnable along the travelling rail 5 are provided. One of the wheels 20, provided on one of the edges of the travelling cart 9 in its front-back width direction, is constituted as a driving wheel 20a, which is driven by an inverter-type electric motor 21 for travelling, and the other one of the wheels 20, provided on the other one of the edges of the travelling travelling cart 9 in its front-back width direction, is constituted as an idling wheel 20b. The travelling cart 9 is arranged to be runnable along the travelling travelling rail 5 by rotatably driving the driving wheel 20a by means of the electric motor 21.

Although not shown in the drawings, the travelling cart 9 is provided with a travelling rotary encoder for detecting the travelling position of the travelling cart 9 in a left and right direction. Onto the rotating axis of the travelling rotary encoder, a sprocket is provided being threaded to a chain, which is provided along the longitudinal direction of the travelling rail 5. The travelling rotary encoder detects the travelling position of the travelling cart 9 in its left and right direction from the travelling distance of the travelling cart 9.

On the platform 11, two article transfer devices 12 are arranged in parallel in the front-back width direction of the travelling cart 10. Each of the article transfer device 12 is provided with a pair of transfer belts 24, which is arranged to freely be close to each other or separated from each other in a left and right direction and movable between a retrieved position where the devices 12 are retrieved to the side of the mount plate 23 for mounting and supporting the articles B and a protruded position where the devices 12 are protruded to the side of external target articles to be transferred. The article transfer devices 12 are arranged as so-called side-belt type transfer device, where in order to drive the pair of transfer belts 24 to the retrieved position or the protruded position the operation mode can be switched between a holding mode for holding the article B from both sides by moving the pair of transfer belts 24 close to each other and an unholding mode for releasing the hold of the article B by moving the pair of transfer belts 24 apart from each other. And, by driving the travelling belts 24, the article B can be transferred between the mount plate 23 and the article storage 4 or the article loading or unloading portions 8. For instance, when transferring an article B from the article storage 4 to the mount plate 23, the transfer belts 24 are protruded from the retrieved position to the protruded position by driving the electric motor for protruding or retrieving the belts (not shown); then the pair of transfer belts 24 are driven to be closed to each other by means of an electric motor for holding articles (not shown), in order to create a holding condition where the both sides of the article B are held by the pair of transfer belts 24 and to transfer the transfer belts 24 by means of the motor 25.

The stacker crane 3 is provided with a crane-side controller 26 for controlling the activity of the stacker crane 3. The controller 26 is operated in accordance with commands from the ground controller 7 for controlling the travelling activities of the travelling cart 9, the lifting activities of the platform 11 and the activities of the article transfer device 12. Thus, the crane control means is composed of the ground-side controller 7 and the crane-side controller 26. Information detected by the rotary encoder for lifting and by the rotary encoder for travelling, and information detected from various other sensors arranged in the stacker crane 3 is input to the crane-side controller 26.

When transferring an article B, the crane-side controller 26 sends a command to control the travelling of the travelling cart 9 and the lifting of the platform 11 for moving the article transfer device 12 to the targeted transfer position corresponding to an article storage 4 or a loading or unloading portion 8; then to control the activity of the article transfer device 12 for transferring the article B between the article storage unit 4 and the loading or unloading portion 8. The ground controller 7 memorizes all of the targeted transfer positions, which correspond to an article storage unit 4 or a loading or unloading portion 8. Further, the ground controller 7 manages the storing condition of the articles B, i.e. which article B is stored in which article storage unit. 4

Once the article B has been transferred to the loading or unloading portion 8, the ground controller 7 selects an article storage 4 to which the article B should be stored and then sends a loading command to the crane-side controller 26. When receiving a request for unloading an article, the ground controller 7 selects the article storage 4 in which the article B to be unloaded is to be stored according to the request for unloading and then sends an unloading command to the crane-side controller 26.

The crane-side controller 26 is arranged to control the actuation of the stacker crane 3 in accordance with the loading command or unloading command from the ground controller 7 so as to store the article B transferred to the loading or unloading portion 8 into the article storage 4, that has been selected for the article B, or so as to unload the article B to be unloaded from the article storage 4 in which the article B has been stored to the loading or unloading portion 8. The loading command includes information about the target transferring position of the loading or unloading portion 8 where the article B has been loaded and the target transferring position of the article storage 4 to which the article B should be stored; and the unloading command includes information about the target transferring position of the article storage 4 in which the article B to be unloaded has been stored and the target transferring position of the loading or unloading portion 8 to which the article B should be unloaded.

Concerning the control for the running actuation of the travelling cart 9, the crane-side controller 26 is arranged to control the actuation of the electric motor 21 such that the controller 26 obtains the position where the travelling cart 9 is running in accordance with information detected by the running rotary encoder so that the obtained position where the travelling cart 9 is running becomes a target running position. Note that the target running position is the running position of the travelling cart 9 when the article transferring device 12 is positioned in the same position in the left or right direction with respect to the target transferring position of the article storage unit 4 or unloading/loading unit 8 which is the subject of transfer from amongst the plurality of article storage units 4 or unloading/loading portions 8.

Concerning the control of the lifting actuation of the platform 11, the crane-side controller 26 is arranged such that it obtains the lifting position of the platform 11 in accordance with information detected by the lifting rotary encoder and controls the actuation of the electric motor 18 for lifting the platform 11 so that the obtained position of the platform 11 becomes the target lifting position. It should be noted that the target lifting position should be a lifting position of the platform 11 when the article transferring device 12 is located at the same position in the vertical direction with respect to the target transferring position of the article storage 4 or the loading or unloading portion 8 for the article subject to transfer from amongst the plurality of article storage units 4 and the plurality of the loading or unloading portions 8, respectively.

In order to take the article B mounted and supported by the article storage 4 or the loading or unloading portion 8, the crane-side controller 26 controls the actuation of the article transferring device 12 in such a manner that the transferring belts 24 are protruded from the retrieved position to the protruded position by a protruding and retrieving motor (not shown) first, then the pair of transferring belts 24 are driven to be close to each other by a clipping motor (not shown) to clip the both ends of the article B thereby, and then the pair of transferring belts 24 are transferred by driving the article transferring motor 25. In order to unload the article B onto the article storage 4 or loading or unloading portion 8, the crane-side controller 26 drives the protruding and retrieving motor (not shown) so as to protrude the transferring belts 24 from the retrieved position to the protruded position, then controls to drive the article transferring motor 25 to transfer the transferring belts 24, then drives the clipping motor (not shown) to make the pair of transferring belts 24 separate from each other to release the clipping with respect to the article B, and then controls the protruding and retrieving motor (not shown) again to retrieve the transferring belts 24 from the protruded position to the retrieved position.

In this manner, the crane-side controller 26 controls the actuation of the stacker crane 3 in accordance with the commands from the ground controller 7 so as to perform the loading work of the article B loaded on the loading or unloading portion 8 into the article storage 4 and the unloading work of the article B stored in the article storage 4 onto the loading or unloading portion 8.

In such an article storage facility, the article B sometimes moves out from the proper stored position in the article storage 4 due to the occurrence of an earthquake, etc. For instance, if the article B moves out from the proper stored position to the front side of the storing shelf 1 in its front-back width direction so as to be protruded from the article storage 4 out the front side, it would contact with the stacker crane 3 which is running on the travelling rail 5. Should the article B moves out from the proper stored position in the sideways widthwise direction of the storing shelf 1, the article transferring device 12 located at the target transferring position could not transfer the article B between the position and the article storage 4. In such cases, an operator has to correct the position of the article B to the proper position to be stored; and in order to do the correction, it is required for the operator to be able to approach each of the article storage units 4. Further, in cases of a system down of the facility or a power failure therefor, unloading articles B stored from the article storage units 4 is sometimes required. In this case, unloading work for taking the articles B stored in the article storage units 4 also has to be done by an operator, and therefore it is required for the operator to be able to approach to each of the article storage units 4.

Figure 3:
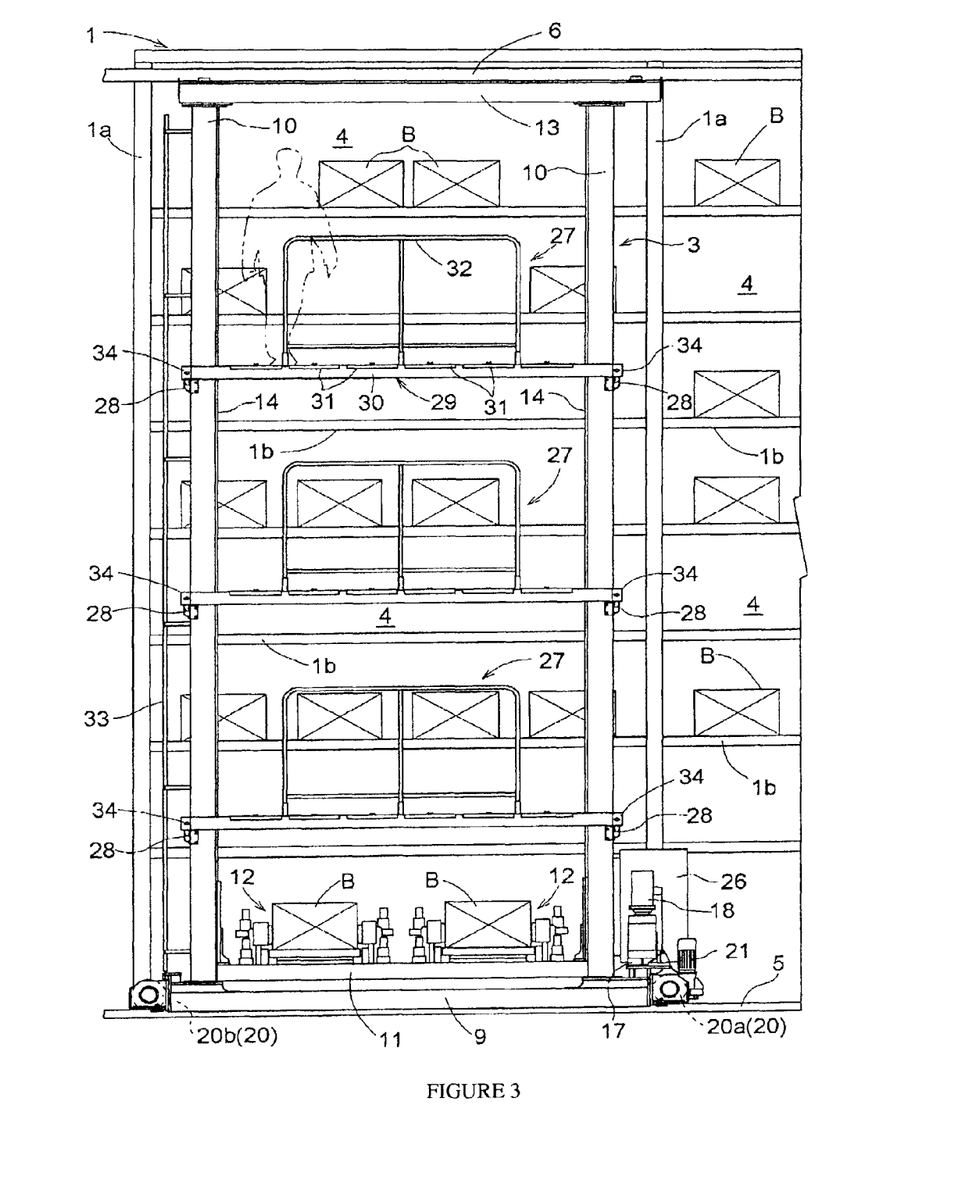
FIG. 3 is a side view illustrating a part of the article storage facility in a condition in which the work frame is installed.
Figure 4:
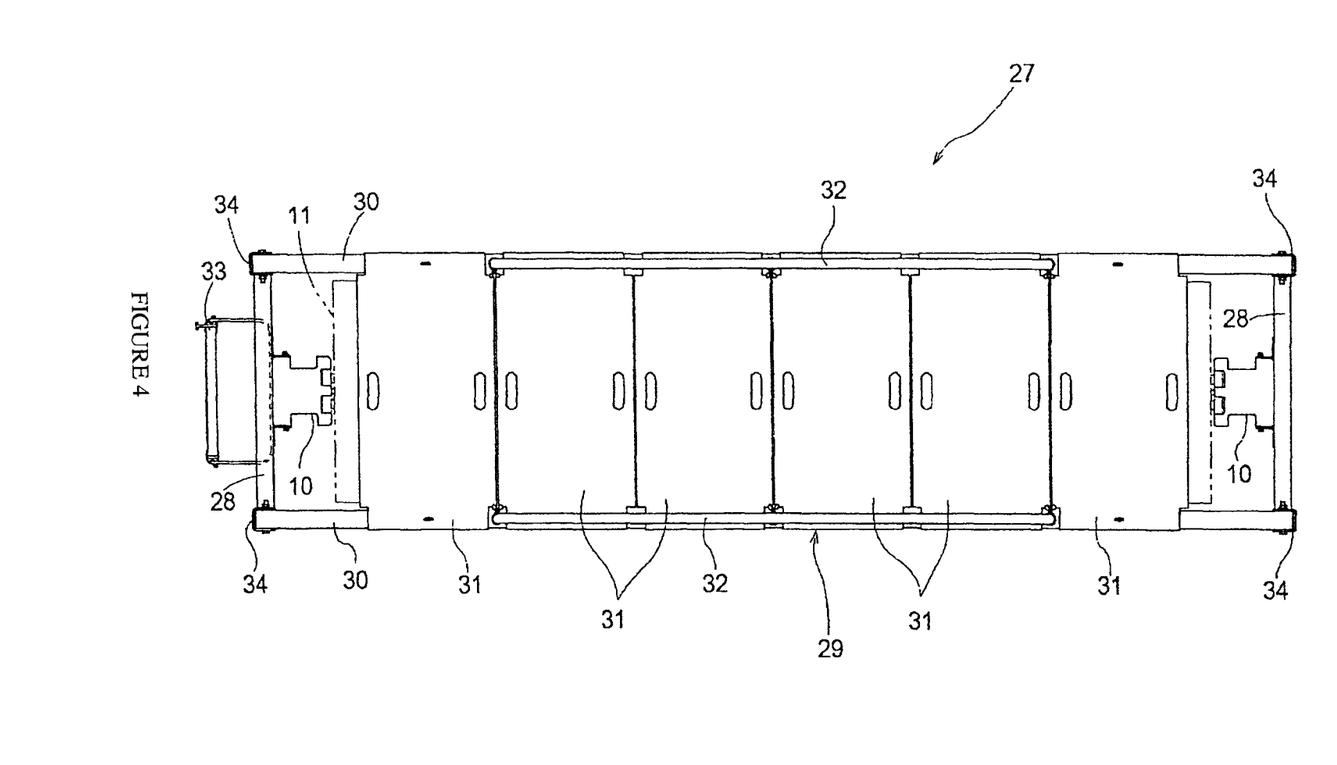
FIG. 4 is a plan view representing a stacker crane with a work frame installed.
Figure 5:
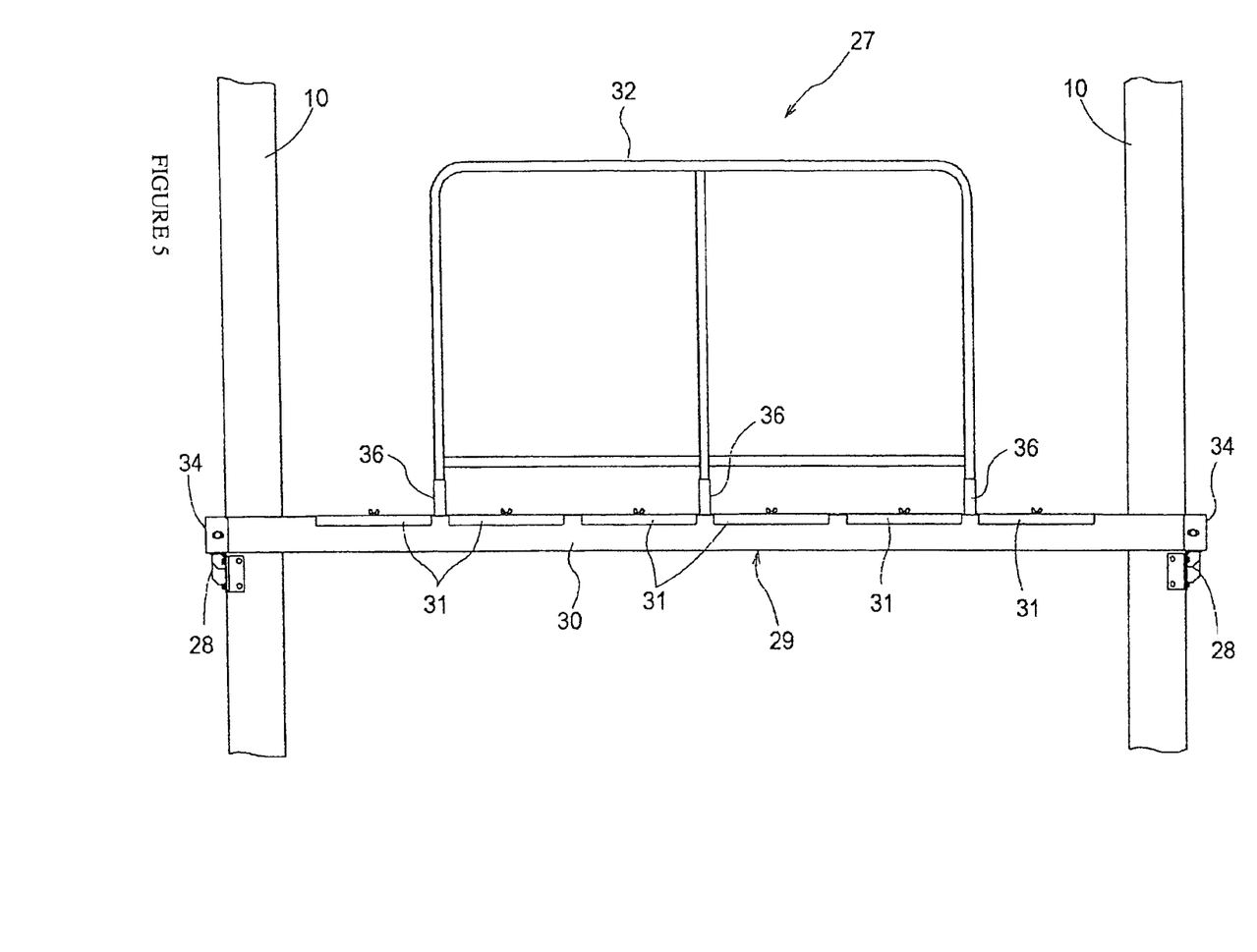
FIG. 5 is a side view showing a stacker crane with a work frame installed.

For this propose, the stacker crane 3 of the present invention is constituted, as shown in FIGS. 3 to 5, such that the work frame 27, having predetermined length and width in the front-back width direction and in the sideways widthwise direction of the travelling cart 9, is freely attached to and detached from a pair of vertical-movement guiding masts 10 therebetween. Thereby, the operator is able to perform the correction of the position of the article B to the proper storing position or the taking-out of the article B stored in the article storage units 4, whilst riding on the work frame 27. And therefore, the operator can perform these works easily and the workability will be thus improved. It should be noted that the front-back width direction of the travelling cart 9 corresponds to the left and right direction in FIG. 3 and to the up and down direction in FIGS. 4 and 5; and the sideways widthwise direction of the travelling cart 9 corresponds to the left and right direction in FIG. 4. FIG. 2 shows the facility where the work frame 27 is removed out and FIGS. 3 to 5 represent the facility where the work frame 27 is attached.

The work frame 27 is detachably attached to a plurality of attachment locations, which are separated from each other in a vertical direction. In FIG. 3, an example is shown where three attachment locations are provided. As shown in FIG. 3, the lowest attachment location among these is set at a higher side the region that the platform 11 and the article B on the platform 11 occupy when the platform 11 comes down to the lowest location in the lifting range thereof. It should be noted that each attachment location is set between the article storage units 4 which are adjacent in the vertical direction. Thereby, the operator riding on one work frame 27 can do the work with respect to two different article storage units 4 in the vertical direction, so that a plurality of work frames 27 can be attached in an effective manner. The distance between the attachment locations in the vertical direction can be set so as to be appropriate for the typical height of an operator, thus enabling the operator to perform the work with respect to a plurality of article storage units 4 provided in the vertical direction.

The work frame 27 has a width extended across the full distance between the pair of vertical-movement guiding masts 10 in the front-back width direction of the travelling cart 9 (left and right direction in FIG. 3, vertical direction in FIGS. 4 and 5), and comprises edge members 28 located on each edge of the travelling cart 9 in the front-back width direction and an intermediate member 29 connecting the edge members 28.

Edge members 28 are fixed to the vertical-movement guiding masts 10, respectively, at a position which does not induce any interruption to the platform 11. The position which does not induce any interruption to the platform 11 means a position such that when the platform 11 is lifted up and down between the pair of vertical-movement guiding masts 10 the edge members do not contact with the platform 11. That is to say, the position should be outside of the gap between the pair of vertical-movement guiding masts 10 in the front back direction of travelling cart 9. The edge members 28 are fixed to the outer surfaces of the rectangular-shaped vertical-movement guiding masts 10, that is, on the sides where the pair of vertical-movement guiding masts 10 are facing away from each other, in the front-back width direction of the travelling cart 9, and are extended at both sides of the travelling cart 9 in the sideways widthwise direction (left and right direction in FIG. 4) from the vertical-movement guiding masts 10, forming a rod-like shape thereof.

The intermediate member 29 is arranged to be freely attachable to and detachable from the edge members 28. The intermediate member 29 comprises a pair of first rod-like intermediate sub-members 30, which are attachable to or detachable from the edge members, respectively, in the sideways widthwise direction of the travelling cart 9 (left and right direction in FIG. 4) and are extended in the front-back width direction of the travelling cart 9 (left and right direction in FIG. 3, vertical direction in FIGS. 4 and 5) when it is attached to the edge members; and a second plate-like intermediate sub-member 31, which is attachable to the pair of first intermediate sub-members 30 in a condition extending across the pair of first intermediate sub-member 30 or detachable therefrom; and a third bar-like intermediate sub-member 32, which is attachable to the first intermediate sub-member 30 so in a condition extending in the upper side and detachable therefrom.

[How to Attach the Work Frame]

First, the ground controller 7 sends a command to the crane-side controller 26 to lift the platform 11 so as to position it at the lowest position in the lifting range thereof. Since the lowest attachment position is set at a side higher than the region occupied by the platform 11 located at the lowest position and the article B mounted on the platform 11, it is possible to attach the work frame 27 at the lowest position without it being interrupted by the platform 11. For example, an operator on a floor attaches the work frame 27 to the lowest attachment position, then the operator rides on the work frame 27 at the lowest attachment position and attaches another work frame 27 at an attachment position one side. In this manner, the work frames 27 are attached to the plurality of attachment positions one by one from the lowest attachment position to the upper positions in order. In order to make it possible that the operator moves to the lowest work frame 27 or the work frame one upper position above it as shown in FIG. 2, the vertical-movement guiding mast 10 (the vertical-movement guiding mast 10 at the left side in the Figures) is provided with a ladder 33 being extended across the longitudinal full length of the mast, so that the operator can climb the ladder 33 up to the target work frame 27.

The attachment of the work frame 27 to each attachment position will be explained below.

Figure 6:
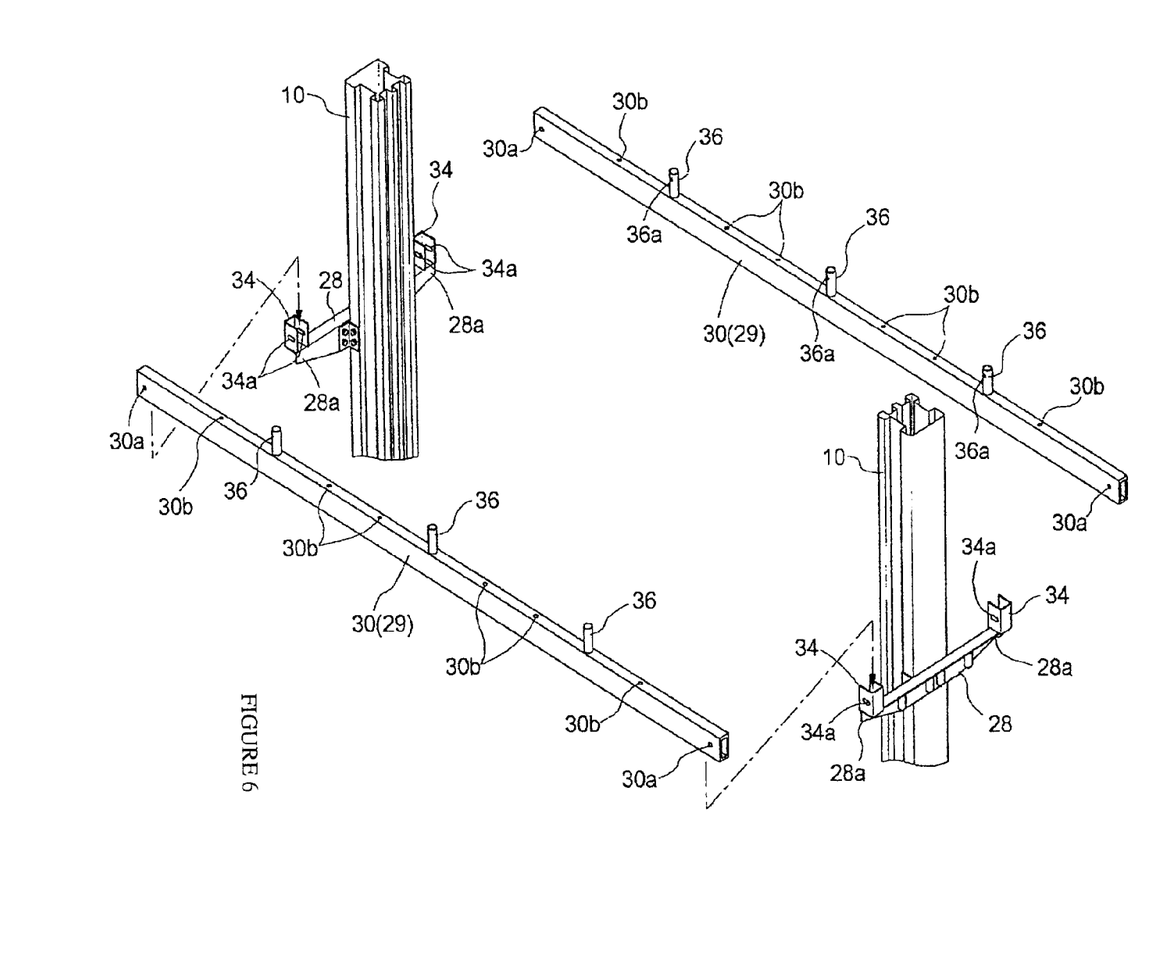
FIG. 6 is a perspective view depicting a method for installing a work frame.
Figure 7:
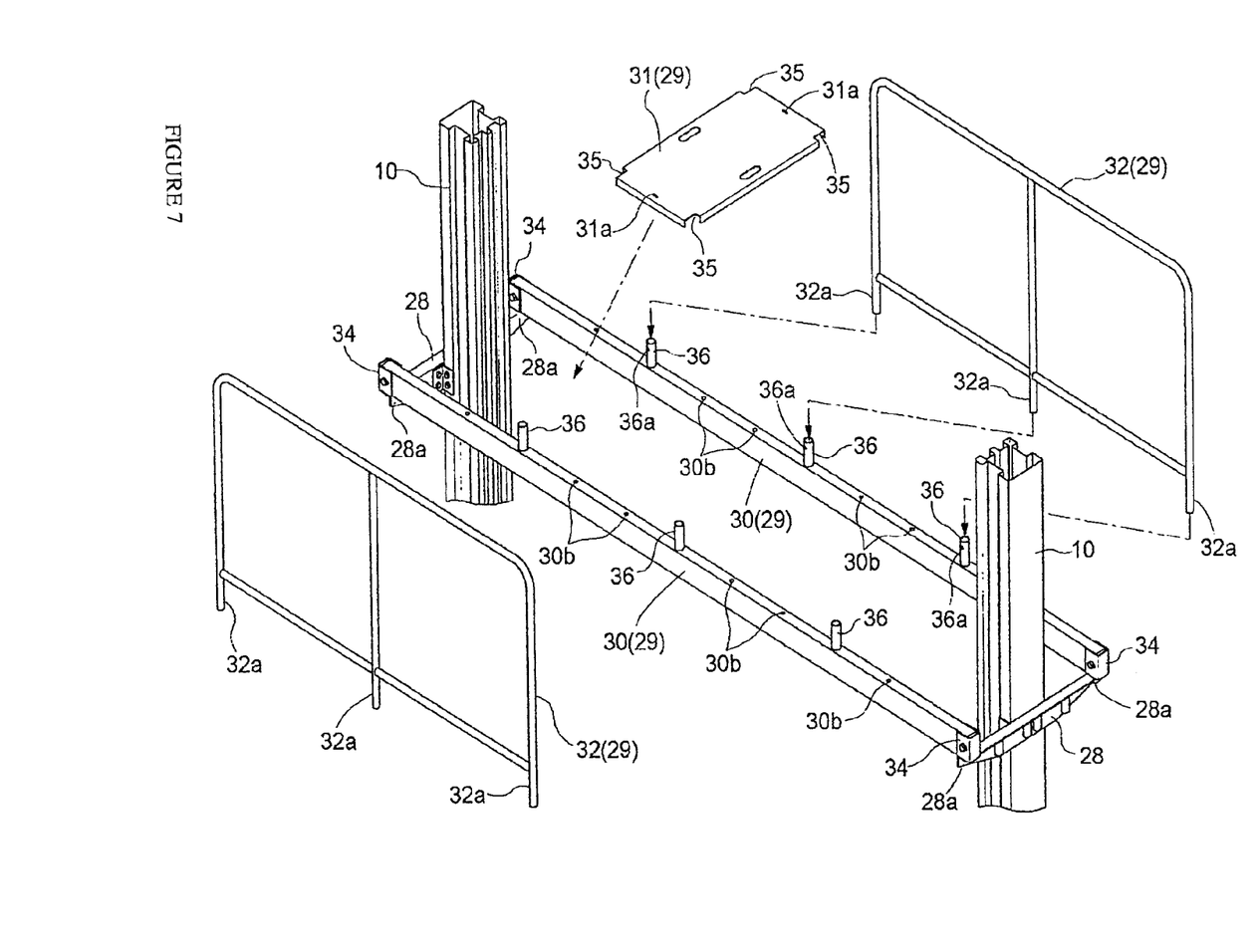
FIG. 7 is a perspective view illustrating a method for installing a work frame.

Since a pair of edge members 28 is preliminarily fixed to each of the pair of vertical-movement guiding masts 10, the operator, as shown in FIG. 6, attaches the first intermediate sub-members 30 so that they extend over the pair of edge members 28. To the ends of the pair of rod-like edge members 28, inserting portions 34 having a reversed C-shape viewed from the top are provided, into which the end portions of said first rod-like intermediate sub-members 30 can be inserted from the upper side. Therefore, the first intermediate sub-members 30 can be properly positioned by inserting the both end portions of the first intermediate sub-members 30 into the inserting portions 34 of the pair of edge members 28, respectively. Once the first intermediate sub-members 30 are placed properly, holes 34a formed in the inserting portions 34 coincident with holes 30a formed in the edge portion of the first intermediate sub-members 30, so that the first intermediate sub-members 30 can be fixed to the edge members 28 by means of fasteners G, such as bolts and nuts. Then, the upper surface of the edge members 28 are urged against the lower surface of the first intermediate sub-members 30, so that the edge members 28 become attachable to the masts, while receiving and supporting the first intermediate sub-members 30 from the bottom side. When attaching a pair of first intermediate sub-members 30 to a pair of edge members 28, a frame having a rectangular shape viewed from the top is formed, as shown in FIG. 7.

Next, the second plate-like intermediate sub-member 31 is attached to the frame in a condition extending across the pair of first intermediate sub-members 30. At end portions of the second intermediate sub-member 31 in the sideways widthwise direction of the travelling cart 9, engagement portions 35 are provided which engage to the upper surfaces of the first intermediate sub-members 30, so that a second intermediate sub member 31 can be positioned at a proper position only by the engagement of the engagement portions 35 to the upper surfaces of the pair of first intermediate sub-members 30, respectively. Once the second intermediate sub-member 31 is properly arranged, the positions of holes 30b formed in the first intermediate sub-members 30 coincident to the positions of holes 31a formed in the second intermediate sub-member 31, and therefore, the second intermediate sub-member 31 can be fixed to the first intermediate sub-members 30 by means of fastner G such as bolts. Thereby, the upper surface of the first intermediate sub-member 30 is urged against the rear surface of the second intermediate sub-member 31, so that the first intermediate sub-member 30 is arranged to be attachable to the masts, while receiving and supporting the second intermediate sub-member 31 from a bottom side. By a plurality of second intermediate sub-members 31 (for instance, six) being attached to the first intermediate sub-members 30 in their longitudinal direction, a work frame 27 having a width being extended over the full length of the distance between the pair of vertical-movement guiding masts 10 in the front-back width direction of the travelling cart 9 and a width being extended over the full length of the edge members 28 in the sideways widthwise direction of the travelling cart 9 can be formed.

Further, the third bar-like intermediate sub-member 32 is attached to the frame in a condition extending from the first intermediate sub-members 30 in an upper direction. On the upper surface of the first intermediate sub-member 30, inserting portions 36 are provided, into which a plurality of leg portions 32a (for instance, three leg portions) of the third intermediate sub-member 32 can be inserted, respectively. Therefore, it is possible to position the third intermediate sub-member 32 properly only by inserting the leg portions 32a into the inserting portions 36. Into the holes 36a formed in the inserting portions 36, fasteners G, such as bolts, are tightened in order to prevent the third intermediate sub-members 32 coming out from the inserting portions 36.

In this manner, a pair of first intermediate sub-members 30 is attached with respect to a pair of edge members 28, then a plurality of second intermediate sub-members 31 and a plurality of third intermediate sub-members 32 are attached with respect to the pair of first intermediate sub-members 30, then a work frame 27 can be installed to the attachment position. When fixing the first intermediate sub-members 30, the second intermediate sub-member 31 and the third intermediate sub-member 32, various fasteners G such as bolts or nuts are used in this embodiment. However, it is possible to arrange such that these members manually fixable by an operator, without using such fasteners. As mentioned above, the operator can move from floor surface to the work frame 27, and from the work frame 27 to another work frame 27 one position higher therefrom with the aid of the ladder 33, so that the operator can attach the work frames 27 with respect to the plurality of attachment positions from the lower side in order. Then, as shown in FIG. 3 by broken line, the operator can perform the correction of the position of the article B to the position where the article B should be stored and the taking-out of the article B stored in the article storage 4, whilst riding on the work frame 27.

Under the condition that a plurality of work frame 27 is attached, the operators step out from the work frame 27 and more away from the stacker crane 3 once. Then for example, the operator, through the operation of a ground controller 7 or a manually operated remote controller, in a condition in which the crane side controller 26 is kept in a maintenance mode, sends a maintenance command for commanding the target running position of the target transfer position for the article storage 4, which is the subject of the operation, as the running position of the travelling cart 9. Thereby, the crane-side controller 26 is enabled to control the running actuation of the travelling cart 9 at a predetermined low speed until the position that was commanded is reached. By this arrangement, it is possible to run the travelling cart 9 with the predetermined low speed, while a plurality of work frames 27 are kept to be attached to the stacker crane 3, so that, if correction work or unloading work is necessary at the article storage units 4 lengthwise and breadthwise, it may be possible to do the work immediately.

When a system shot down or a power failure occurs, an operator can manually push the stacker crane 3 to make the travelling cart 9 run by releasing a negative brake of the running electric motor 21. Thus, even if a system shot down or a power failure occurs, the travelling cart 9 can be manually run by the operator so that the correction work or unloading work at the plurality article storage units 4 lengthwise and breadthwise can be performed.

As mentioned above, once a command to run the travelling cart 9 is sent from the ground controller 7 or the remote controller for manual operation, the crane-side controller 26 controls the running actuation of the travelling cart 9 with a preliminarily determined lower speed in accordance with the command. On the other hand, the crane side controller 26 inhibits the lifting actuation of the platform 11 during the period when the attachment condition detecting means is detecting the fact that the work frame 27 is attached to the pair of vertical-movement guiding masts 10 therebetween. Therefore, in a condition that the work frames 27 are attached, the lifting up and down in error of the platform 11 can be prevented, so the contact between the platform 11 and the work frames 27 can be surely prevented. The attachment condition detecting means, which is not shown in the Figures, can be composed of light transmitting and receiving sensors, where the light transmitting sensor, which is provided on the platform 11, for example, emits a light beam to the upper side in a vertical direction and the light receiving sensor receives the light beam reflected by a reflector provided on the upper frame 13. When no light is detected by the light emitting and receiving sensors, the condition in which the work frame 27 is attached can be detected. Another sensor for detecting the condition in which the first intermediate sub-members 30 are inserted into the inserting portions 34 of the edge members 28 may be provided, and if it is detected that a first intermediate sub-member 30 is inserted into the edge members 28, it means that the work frame 27 is attached.

Concerning removal of the work frames 27, the reverse procedure to the attachment of the work frames 27 can be applied, but the order of removal should be that the work frame 27 attached at the uppermost attachment position should be removed first.

[Other Embodiments]

(1) In the above-mentioned embodiment, the edge members 28, which constitute a part of work frame 27 are provided on the vertical-movement guiding masts 10 in a fixed condition. However, the edge members 28 can be arranged to be attachable to or detachable from the vertical-movement guiding masts 10, and then the work frame 27 as a whole can be attached to or detached from the pair of vertical-movement guiding masts 10 thereetween.

(2) In the above-mentioned embodiment, the intermediate member 29 is composed of three members, i.e. the first intermediate sub-members 30, the second intermediate sub-member 31, and the third intermediate sub-member 32. However, the first intermediate sub-members 30 and the third intermediate sub-member 32 can be formed integrally. The number of sub-members constituting the intermediate member 29 is a matter of design.

(3) In the above-mentioned embodiment, a running encoder is provided to detect the running position of the travelling cart 9. However, a laser macrometer can be provided on the travelling cart 9, instead, which emits a measurement light toward a reflector on the end portion of the travelling rail 5 to detect the distance from the end portion of the travelling rail 5 to the travelling cart 9, to detect the running position of the travelling cart 9 can also be detected by the laser macrometer.

Furthermore, instead of the lifting rotary encoder for detecting the lifted position of the platform 11, such a laser macrometer can be used.

(4) In the above mentioned embodiment, the crane-side controller 26 allows the travelling cart 9 is to be able to run under the condition that the work frames 27 are attached between the pair of vertical-movement guiding masts 10. However, the crane-side controller 26 can instead inhibit the running actuation of the travelling cart 9 during the time it is detecting the condition that the work frames 27 are attached. In this case, by releasing the negative brake of the running electric motor 21, the travelling cart 9 can run by a pushing operation of the operator.

(5) In the above-mentioned embodiment, a so-called side belt type transferring device is exemplified as an article transferring device 12. However, another article transferring device, such as a side-clamping type article transferring device, could also be applied, by which a plurality of articles B, which are mounted on the plate 1b in parallel, can be transferred between the plate 1b and the article transferring device at the same time.

Such a side-clamping type article transferring device comprises a conveyer for conveying articles B in a transferring direction, whilst the articles B are mounted thereon, and a pair of clampers, which are freely close to or separated from each other in a direction perpendicular to the transferring direction and are freely protruded or retrieved between the retrieved position at which the clampers are retrieved to the conveyer side and the protruded position at which the clampers are protruded to the external position where articles to be transferred exist. The side-clamping type article transferring device transfers articles B between the conveyor and the article mounting plate 1b by protruding or retrieving the articles B while clamping them with the pair of clampers.

LIST OF NUMERICAL REFERENCES

1 storing shelf
3 stacker crane
4 article storage unit
5 travelling rail
7 crane control means (ground controller)
9 travelling cart
10 vertical-movement guiding mast
11 platform
12 article transferring device
27 work frame
28 edge member
29 intermediate member
30 first intermediate sub-member 31 second intermediate sub-member
32 third intermediate sub-member
B article

The invention claimed is:

1. An article storage facility comprising:
   storing shelves configured with a plurality of article storage units lined in a vertical and breadthwise direction, the storing shelves having a front-back width direction,
   a stacker crane being arranged to be runnable along travelling rails provided at the front side of the storing shelves along a sideways widthwise direction of the shelves to convey articles to each of the article storage units, and
   a crane control means for controlling the actuation of the stacker crane;
   wherein said stacker crane comprises a travelling cart runnable along the travelling rails, a pair of vertical-movement guiding masts being stood from both edge portions of the travelling cart in the front-back width direction, a platform being freely lifted along the pair of front and rear vertical-movement guiding masts therebetween, and an article transfer device being provided to the platform; and
   wherein said stacker crane is constructed so as to have a work frame between said pair of vertical-movement guiding masts, which is attachable thereto or detachable therefrom, with a setup width in the front-back width direction and the sideways widthwise direction of the travelling cart, the work frame coupled to and extending between the pair of vertical-movement guiding masts, the work frame defining a pair of openings defined therein and aligned and spaced apart in the front-back width direction;
   wherein the openings of the work frame provide a locating feature to enable an operator to properly position the storage units on the storing shelves such that the storage units are aligned with at least a portion of each of the pair of openings.

2. An article storage facility according to claim 1, wherein the work frame having a width extending across the full length of the distance between the pair of vertical-movement guiding masts in the front-back width direction of the travelling cart, is comprised of edge members located on the edges of the travelling cart in the front-back width direction thereof, and an intermediate member connecting the edge members to each other; and
   wherein said edge members are fixed to the vertical-movement guiding masts, respectively, so as not to interfere with the platform, and wherein said intermediate member is arranged to be attachable to and detachable from the edge members.

3. An article storage facility according to claim 2, wherein the edge members have a rod-like shape being extended from the vertical-movement guiding masts to both sides of the travelling cart in the sideways widthwise direction; and wherein the intermediate member is comprised of a pair of rod-like shaped first intermediate sub members, which can be installed to or uninstalled from the edge portions of the edge members in the width direction of the travelling cart, respectively, and being extended in the front-back width direction of the travelling cart when it is installed to the edge members, a plate-like second intermediate sub-member, which can be installed to or uninstalled from the pair of first intermediate sub-members so as to be extended across the pair of first intermediate sub members, and a bars-like shaped third intermediate sub-member, which can be installed to or uninstalled from the pair of first intermediate sub-members so as to be extended in an upper direction.

4. An article storage facility according to claim 2 further comprising an install condition detecting means for detecting an install condition of the work frame between the pair of vertical-movement guiding masts, wherein the crane controlling means inhibits the lifting activity of the platform when the install condition detecting means detects a fact that the work frame has been installed.

5. An article storage facility according to claim 2, wherein the work frame can be freely be installed to a plurality of install positions, which are arranged to be spaced in a vertical direction; and the lowest install position among the plurality of install portions is arranged at a position in a side higher than the region, which the platform itself and articles existing on the platform occupy when the platform is moved to the lowest position of the lifting range of the platform.

6. An article storage facility according to claim 3 further comprising an install condition detecting means for detecting an install condition of the work frame between the pair of vertical-movement guiding masts, wherein the crane controlling means inhibits the lifting activity of the platform when the install condition detecting means detects a fact that the work frame has been installed.

7. An article storage facility according to claim 3, wherein the work frame can be freely be installed to a plurality of install positions, which are arranged to be spaced in a vertical direction; and the lowest install position among the plurality of install portions is arranged at a position in a side higher than the region, which the platform itself and articles existing on the platform occupy when the platform is moved to the lowest position of the lifting range of the platform.

8. An article storage facility according to claim 3, wherein the edge members are arranged to be installable to the masts in a condition in which they receive and support the first intermediate sub-members from the lower side and the first intermediate sub-members are arranged to be installable to the edge members in a condition in which they receive and support the second intermediate sub-members from the lower side.

9. An article storage facility according to claim 8, wherein the work frame can be freely be installed to a plurality of install positions, which are arranged to be spaced in a vertical direction; and the lowest install position among the plurality of install portions is arranged at a position in a side higher than the region, which the platform itself and articles existing on the platform occupy when the platform is moved to the lowest position of the lifting range of the platform.

10. An article storage facility according to claim 8 further comprising an install condition detecting means for detecting an install condition of the work frame between the pair of vertical-movement guiding masts, wherein the crane controlling means inhibits the lifting activity of the platform when the install condition detecting means detects a fact that the work frame has been installed.

11. An article storage facility according to claim 1 further comprising an install condition detecting means for detecting an install condition of the work frame between the pair of vertical-movement guiding masts, wherein the crane controlling means inhibits the lifting activity of the platform when the install condition detecting means detects a fact that the work frame has been installed.

12. An article storage facility according to claim 11, wherein the work frame can be freely be installed to a plurality of install positions, which are arranged to be spaced in a vertical direction; and the lowest install position among the plurality of install portions is arranged at a position in a side higher than the region, which the platform itself and articles existing on the platform occupy when the platform is moved to the lowest position of the lifting range of the platform.

13. An article storage facility according to claim 1, wherein the work frame can be freely be installed to a plurality of install positions, which are arranged to be spaced in a vertical direction; and the lowest install position among the plurality of install portions is arranged at a position in a side higher than the region, which the platform itself and articles existing on the platform occupy when the platform is moved to the lowest position of the lifting range of the platform.

14. An article storage facility comprising:
storing shelves configured with a plurality of article storage units lined un in a vertical and breadthwise direction,
a stacker crane being arranged to be runnable along travelling rails provided at the front side of the storing shelve along a sideways widthwise direction of the shelves along the sideways widthwise direction of the storing shelves to convey articles to each of the article storage units, and
a crane control means for controlling the actuation of the stacker crane;
an install condition detecting means for detecting an install condition of the work frame between the pair of vertical-movement guiding masts, wherein the crane controlling means inhibits the lifting activity of the platform when the install condition detecting means detects a fact that the work frame has been installed,
wherein said stacker crane comprises a travelling cart runnable along the travelling rails, a pair of vertical-movement guiding masts being stood from both edge portions of the travelling cart in the front-back width direction of the travelling cart, a platform being freely lifted along the pair of front and rear vertical-movement guiding masts therebetween, and an article transfer device being provided to the platform;
wherein said stacker crane is constructed so as to have a work frame between said pair of front and rear vertical-movement guiding masts, which is attachable thereto or detachable therefrom, with a setup width in the front-back width direction and the sideways widthwise direction of the travelling cart.

15. An article storage facility comprising:
storing shelves configured with a plurality of article storage units lined un in a vertical and breadthwise direction,
a stacker crane being arranged to be runnable along travelling rails provided at the front side of the storing shelve along a sideways widthwise direction of the shelves along the sideways widthwise direction of the storing shelves to convey articles to each of the article storage units, and
a crane control means for controlling the actuation of the stacker crane;
wherein said stacker crane comprises a travelling cart runnable along the travelling rails, a pair of vertical-movement guiding masts being stood from both edge portions of the travelling cart in the front-back width direction of the travelling cart, a platform being freely lifted along the pair of front and rear vertical-movement guiding masts therebetween, and an article transfer device being provided to the platform;
wherein said stacker crane is constructed so as to have a work frame between said pair of front and rear vertical-movement guiding masts, which is attachable thereto or detachable therefrom, with a setup width in the front-back width direction and the sideways widthwise direction of the travelling cart;
wherein the work frame can be freely be installed to a plurality of install positions, which are arranged to be spaced in a vertical direction; and the lowest install position among the plurality of install portions is arranged at a position in a side higher than the region, which the platform itself and articles existing on the platform occupy when the platform is moved to the lowest position of the lifting range of the platform.

* * * * *

UNITED STATES PATENT AND TRADEMARK OFFICE
CERTIFICATE OF CORRECTION

PATENT NO.        : 8,670,861 B2
APPLICATION NO.   : 13/383997
DATED             : March 11, 2014
INVENTOR(S)       : Yoshinaga It is certified that error appears in the above-identified patent and that said Letters Patent is hereby corrected as shown below:

In the Claims

Column 16, Line 11, Claim 5:

After "work frame can be freely"
Delete "be".

Column 16, Line 26, Claim 7:

After "work frame can be freely"
Delete "be".

Column 16, Line 42, Claim 9:

After "work frame can be freely"
Delete "be".

Column 16, Line 64, Claim 12:

After "work frame can be freely"
Delete "be".

Column 17, Line 5, Claim 13:

After "work frame can be freely"
Delete "be".

Signed and Sealed this
Seventeenth Day of June, 2014

Michelle K. Lee
*Deputy Director of the United States Patent and Trademark Office*

CERTIFICATE OF CORRECTION (continued)
U.S. Pat. No. 8,670,861 B2

Column 17, Lines 14-15, Claim 14:

After "storage units lined"
Delete "un" and insert -- up --.

Column 17, Line 16, Claim 14:

After "front side of the storing"
Delete "shelve" and insert -- shelves --.

Column 18, Line 9, Claim 15:

After "front side of the storing"
Delete "shelve" and insert -- shelves --.

Column 18, Line 30, Claim 15:

After "work frame can be freely"
Delete "be".